United States Patent [19]

Birbara et al.

[11] Patent Number: 5,281,254
[45] Date of Patent: Jan. 25, 1994

[54] CONTINUOUS CARBON DIOXIDE AND WATER REMOVAL SYSTEM

[75] Inventors: Philip J. Birbara, Windsor Locks; Timothy A. Nalette, Tolland, both of Conn.

[73] Assignee: United Technologies Corporation, Hartford, Conn.

[21] Appl. No.: 887,062

[22] Filed: May 22, 1992

[51] Int. Cl.5 .................. B01D 53/22; B01D 61/38
[52] U.S. Cl. ................................. 95/44; 95/51; 96/5; 96/7
[58] Field of Search ............... 55/16, 68, 158; 423/226, 228, 229

[56] References Cited

U.S. PATENT DOCUMENTS

| | | | |
|---|---|---|---|
| 2,143,393 | 1/1939 | Ulrich et al. | 423/228 |
| 2,433,741 | 12/1947 | Crawford | 55/16 |
| 2,506,656 | 5/1950 | Wallach et al. | 55/16 |
| 3,335,545 | 8/1967 | Robb et al. | 55/158 X |
| 3,396,510 | 8/1968 | Ward, III et al. | 55/158 X |
| 3,447,286 | 6/1969 | Dounoucos | 55/158 X |
| 3,503,186 | 3/1970 | Ward, III | 55/158 X |
| 3,625,734 | 12/1971 | Ward, III | 55/158 X |
| 3,629,075 | 12/1971 | Gutbier | 55/158 X |
| 3,676,220 | 7/1972 | Ward, III | 55/158 X |
| 3,751,879 | 8/1973 | Allington | 55/158 |
| 3,911,080 | 10/1975 | Mehl et al. | 55/158 X |
| 4,117,079 | 9/1978 | Bellows | 55/158 X |
| 4,119,408 | 10/1978 | Matson | 55/158 X |
| 4,710,205 | 12/1987 | Deetz et al. | 55/16 X |
| 4,750,918 | 6/1988 | Sirkar | 55/16 |
| 4,954,145 | 9/1990 | Thakore et al. | 55/16 |
| 4,973,434 | 11/1990 | Sirkar et al. | 55/16 X |
| 5,045,206 | 9/1991 | Chen et al. | 55/16 X |
| 5,135,547 | 8/1992 | Tsou et al. | 55/16 |

OTHER PUBLICATIONS

Carbon Dioxide-Oxygen Separation: Facilitated Transport of Carbon Dioxide Across a Liquid Film; Jun. 16, 1967; pp. 1481-1483; Science, vol. 156; W. Ward, III; W. Robb.

Stabilized Ultrathin Liquid Membranes for Gas Separations; 1987; pp. 152-165; American Chemical Society; D. Deetz.

Facilitated Transport of $CO_2$ through an Immobilized Liquid Membrane of Aqueous Diethanolamine; Nov. 10, 1990; pp. 2093-2100; Ind. Eng. Chem. Res., vol. 29; A. Guha; S. Majumdar; K. Sirkar.

Primary Examiner—Robert Spitzer
Attorney, Agent, or Firm—Pamela J. Curbelo

[57] ABSTRACT

Carbon dioxide and water vapor are continuously removed by a venting membrane system which employs porous membranes and a liquid amine based sorbent, and which has a partial pressure gradient across the porous membranes. The partial pressure gradient induces absorption of carbon dioxide and water vapor from a gaseous stream, transport of the absorbed carbon dioxide through the pores of the membrane or to a second membrane, and desorption of the absorbed carbon dioxide.

5 Claims, 2 Drawing Sheets

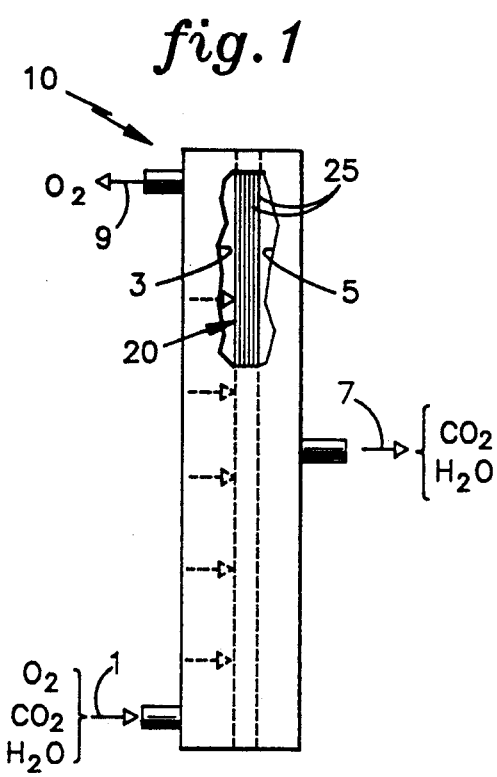
fig.1
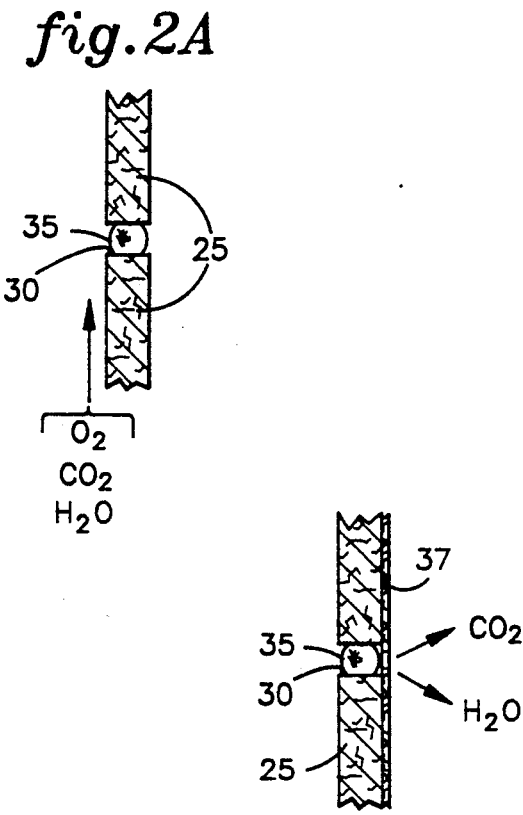
fig.2A
fig.2B
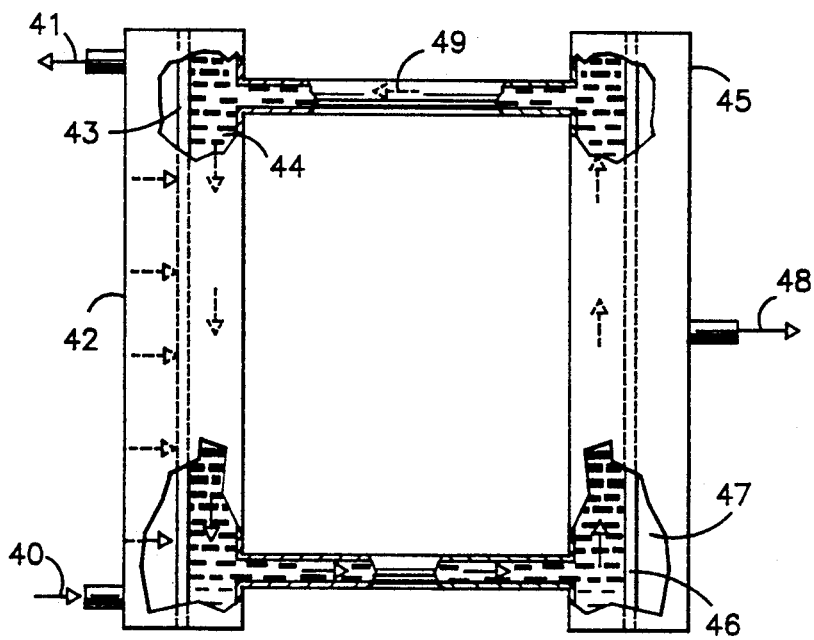
fig.3

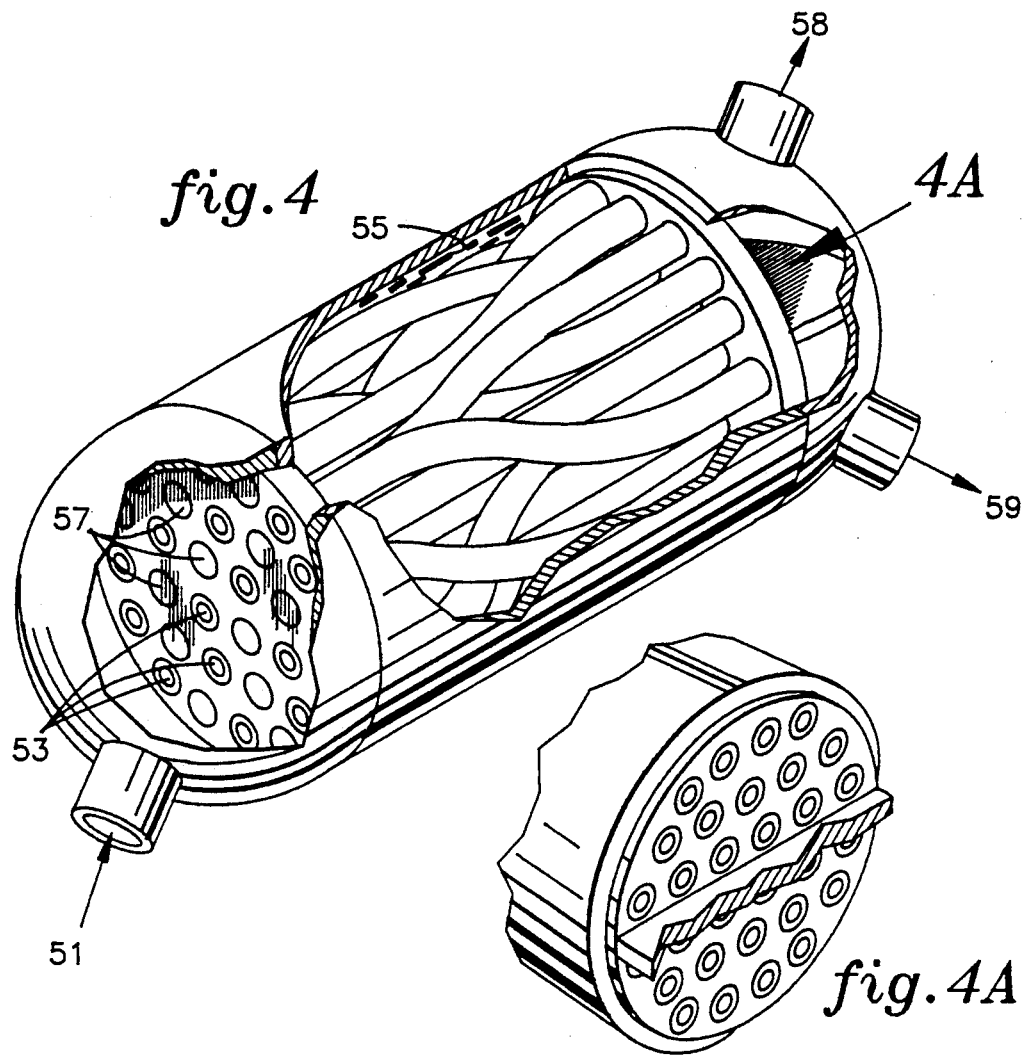
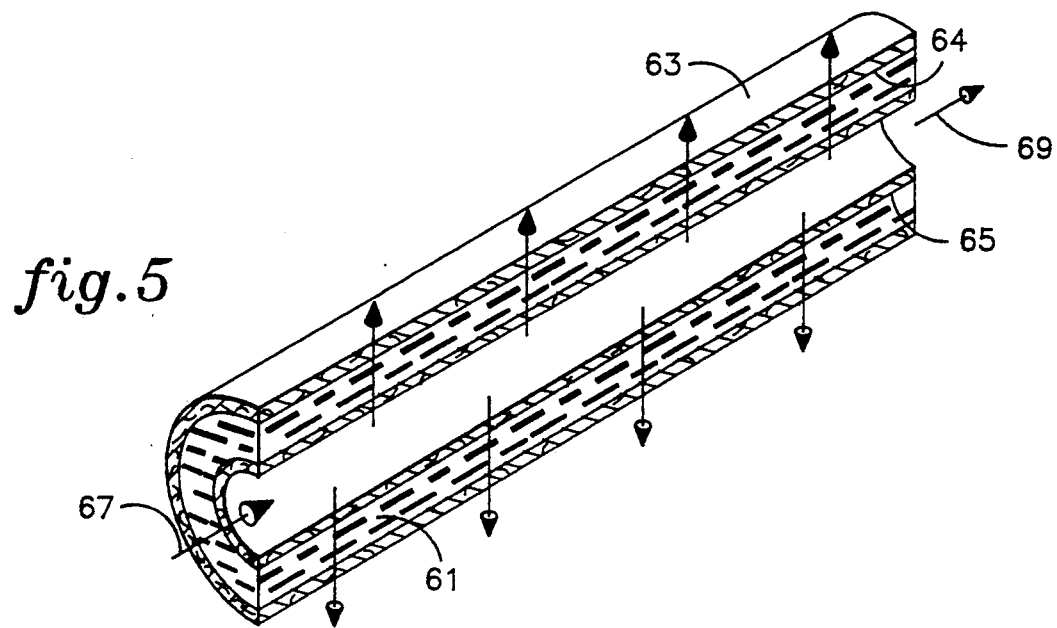

CONTINUOUS CARBON DIOXIDE AND WATER REMOVAL SYSTEM

TECHNICAL FIELD

The present invention relates to a system for the removal of carbon dioxide from a gaseous stream, and especially relates a system for continuous carbon dioxide removal.

BACKGROUND OF THE INVENTION

Since exposure to carbon dioxide partial pressures exceeding about 7.6 mm Hg (partial pressure of about 1.0%) for extended periods of time can cause adverse health problems in humans and other mammals, and since mammals biologically produce carbon dioxide, closed environmental systems such as submarines and spacecraft, often require the removal of this carbon dioxide and carbon dioxide produced by other processes. Various removal techniques have been developed using sorbents which remove carbon dioxide and/or water from a gaseous stream by physical or chemical means. These sorbents include supported and unsupported regenerable and nonregenerable carbon dioxide sorbents such as metal oxides, molecular sieves, alkali metal carbonates, alkali metal hydroxides, and combinations thereof, among others.

Important characteristics of these sorbents, especially those utilized in closed environment systems, include regenerability, structural integrity, absorption-desorption cyclical life, energy requirements for regeneration, and volume and weight considerations. Since metal oxide-alkali metal carbonate sorbents can be formed without inert material yet retain structural integrity while possessing an extended cyclical life and high carbon dioxide loadings, they are useful for carbon dioxide removal in closed environments. Some of these metal oxide-alkali metal carbonate sorbents are regenerable and unsupported, having cyclical lives up to or greater than about 100 cycles and carbon dioxide loadings of up to about 20 lb/ft$^3$.

In the closed environment provided by a submarine, amines, such as monoethanolamine and diethanolamine, are often used to absorb carbon dioxide. These amines are utilized in an aqueous phase, typically 25 to 30 weight percent (wt %) amine. The amine solution enters the top of an absorption tower while the carbon dioxide containing gaseous stream is introduced to the bottom of the tower. The amine intimately contacts the gaseous stream in a countercurrent fashion and chemically absorbs carbon dioxide in the gaseous stream. Desorption of this carbon dioxide is then accomplished in a thermal regeneration process at temperatures in excess of 150° F. During desorption, carbon dioxide and water vapor evolve and are then separated by condensing the water vapor in a heat exchanger. Since the gaseous stream often contains acid gas contaminants which limit the amine based sorbent life through irreversible reaction, the amine sorbent solutions typically possess a life of up to six months of continuous use.

Although the above regenerable sorbents provide useful means for carbon dioxide and water sorption, artisans perpetually seek improved sorbents requiring lower volume and weight penalties, lower energy requirements for regeneration, and possessing high cyclical life and continuous operation. Therefore, what is needed in the art is a carbon dioxide and water sorbent capable of continuous operation at high carbon dioxide removal rates with low volume, weight, and power requirements.

DISCLOSURE OF THE INVENTION

The present invention relates to an immobilized liquid membrane system for the removal of carbon dioxide from a gaseous stream. This system includes at least one porous membrane, a liquid amine based sorbent for absorbing and desorbing carbon dioxide located in the pores of the membrane, and a means for producing a carbon dioxide partial pressure gradient sufficient to induce absorption of the carbon dioxide at the first side of the membrane, transport of the absorbed carbon dioxide across the pores of the membrane, and desorption of the absorbed carbon dioxide at the second side of the membrane.

The present invention further relates to a membrane contactor system for the removal of carbon dioxide from a gaseous stream. This membrane contactor system has a first and a second porous membrane with a liquid amine based sorbent on a first side of both the first and second porous membranes, and a means for producing a carbon dioxide partial pressure gradient across the second porous membrane sufficient to induce absorption of the carbon dioxide at the first porous membrane, transport of the absorbed carbon dioxide to the second porous membrane, and desorption of the absorbed carbon dioxide.

The present invention also relates to a contained liquid membrane system for removing carbon dioxide from a gaseous stream. This contained liquid membrane system has a first and second plurality of hollow fibers surrounded by a liquid amine based sorbent, and a means for producing a carbon dioxide partial pressure gradient sufficient to induce absorption of the carbon dioxide through the first plurality of hollow fibers, transport of the absorbed carbon dioxide to the second plurality of hollow fibers, and desorption of the absorbed carbon dioxide.

The present invention further relates to a concentric contained liquid membrane system for the removal of carbon dioxide from a gaseous stream. The concentric contained liquid membrane system is comprised of a porous hollow outer fiber with an inner and an outer surface, a porous hollow inner fiber with an inner and an outer surface and located inside said outer fiber, a liquid amine based sorbent for absorbing and desorbing carbon dioxide interposed between and in intimate contact with the inner surface of said outer fiber and the outer surface of the inner fiber, and a means for producing a carbon dioxide partial pressure gradient sufficient to induce absorption of the carbon dioxide through the inner fiber, transport of the absorbed carbon dioxide to the inner surface of the outer fiber, and desorption of the absorbed carbon dioxide.

The present invention also relates to a method for removing carbon dioxide from a gaseous stream using a carbon dioxide removal system having at least one porous membrane. This method includes contacting the gaseous stream and the amine based sorbent at a first side of the membrane, absorbing the carbon dioxide, transporting the absorbed carbon dioxide across the pores to the second side of the membrane, and subsequently desorbing the absorbed carbon dioxide.

The present invention further relates to a method for removing carbon dioxide from a gaseous stream using a carbon dioxide removal system having two or more porous membranes. This method includes contacting the gaseous stream with the second side of the first membrane, absorbing the carbon dioxide through the pores of the membrane into the amine based sorbent, transporting the absorbed carbon dioxide to the first side of the second membrane, and subsequently desorbing the absorbed carbon dioxide.

The foregoing and other features and advantages of the present invention will become more apparent in the following description and accompanying drawings.

BRIEF DESCRIPTION OF THE DRAWINGS

FIG. 1 is a schematic of one embodiment of the carbon dioxide removal system of the present invention utilizing porous membranes.

FIG. 2A is a magnification of a single hollow fiber membrane from FIG. 1 which reveals the sorbent within the pore of the membrane.

FIG. 2B is a magnification of a single hollow fiber membrane from FIG. 1 which reveals a thin film composite subsystem supplying structural support to the sorbent within the pore of the membrane.

FIG. 3 is a second embodiment of the carbon dioxide removal system of the present invention utilizing a membrane contactor system.

FIG. 4 is a third embodiment of the carbon dioxide removal system of the present invention utilizing a contained liquid membrane system.

FIG. 4A is a cross sectional view of one end of the contained liquid membrane system of FIG. 4.

FIG. 5 is a fourth embodiment of the carbon dioxide removal system of the present invention utilizing a concentric contained liquid membrane system.

BEST MODE FOR CARRYING OUT THE INVENTION

The carbon dioxide removal system of the present invention is a combination of an amine based sorbent and a venting membrane system. This system utilizes an absorption partial pressure to absorb carbon dioxide and then a desorption partial pressure to desorb the absorbed carbon dioxide and to regenerate the amine based sorbent such that the desorption partial pressure is lower than the absorption partial pressure thereby generating a pressure swing regeneration system. The amine based sorbent functions as a means of absorbing and desorbing carbon dioxide and/or water (hereafter referred to as carbon dioxide) from a gaseous stream while the venting membrane system, comprised of a plurality of membranes, functions as a means of supporting the amine based sorbent and a means of separating the amine based sorbent, the gaseous stream, and the desorbed carbon dioxide.

The amine based sorbent is a liquid sorbent which is capable of absorbing and desorbing carbon dioxide using pressure swing regeneration. The characteristics of the amine based sorbent include: low volatility, nontoxicity, low viscosity, and the ability to absorb carbon dioxide from relatively low partial pressures of less than 7.6 mm Hg (millimeters of mercury) to negligible levels (typically below about 0.1 mm Hg). Generally, the amine based sorbent volatility is below about 0.5 mm Hg with below about 0.01 mm Hg at 20° C. preferred, while its viscosity is below about 75 centipoise (cp) with below about 50 cp preferred. Typical amine based sorbents include amines, such as 2-amino-2-methyl-1,3-propanediol, 2-hydroxyethyl piperazine, methyldiethanolamine, monoethanolamine, tetraethylenepentamine, triethanolamine, polyethylene imine (PEI), and other amine based sorbents. The preferred amine based sorbent is polyethylene imine and especially polyethylene imine 18 (PEI 18) (molecular weight of 1800). PEI 18 has a viscosity of greater than 10,000 cp and a vapor pressure of less than 0.01 mm Hg at room temperature.

In order to enhance the amine based sorbent's carbon dioxide sorption rates, reduce its viscosity, and facilitate transport of the absorbed carbon dioxide, a solvent can be added to the amine based sorbent. This solvent should similarly possess low volatility, low viscosity, and nontoxic properties. Possible solvents include alcohols, cyclic ketone, esters, ethers, and mixtures thereof, including dimethyl ether of polyethylene glycol, glycerol, methoxy triethylene, glycol diacetate, polyethylene glycol, propylene carbonate, 1,2-propylene glycol, and others. The preferred solvent for a given application can readily be determined by an artisan. Important factors for the selection of the solvent and the amine based sorbent include: chemical compatibility, solubility of the amine based sorbent in the solvent, absorption/desorption kinetics, nontoxicity, low viscosity, and low volatility.

The amine based sorbent solution contacts, without intimate mixing, the carbon dioxide containing gaseous stream within a venting membrane system. This venting membrane system promotes carbon dioxide removal via partial pressure gradients by utilizing a plurality of porous membranes which contain or support the amine based sorbent. Typical porous membranes which can be utilized in the venting membrane system include: microporous membranes having a pore size less than about 0.05 microns, fabricated from Teflon ®, polysulfone, and polypropylene, and asymmetric membranes, typically fabricated from polypropylene, polyethylene, polyethersulfone, Teflon ®, and others. The microporous polypropylene membranes are preferred due to availability and hydrophobic characteristics of these membranes which helps prevent amine based sorbent and solvent loss during the pressure swing regeneration (as described below). Additionally, as a result of the porosity, these membranes allow direct liquid gas contact while preventing sorbent leakage.

The porous membranes are available in numerous shapes including sheets, hollow fibers, and others. Some such membranes include Celgard ®, a polypropylene membrane, produced by Hoechst Celanese, Charlotte, N.C.; polypropylene and asymmetric membranes in sheet and hollow fiber forms produced by Mitsubishi Rayon, New York, N.Y.; and asymmetric polysulfone hollow fibers produced by Romicon Corporation, Woburn, Mass. Membranes possessing a porosity of about 30% are currently commercially available. However, higher porosity membranes are preferred as they provide high surface area and reduced material requirements. Celgard ® hollow fiber membranes have proven particularly useful due to their high surface area per given volume and porosity of about 30%.

The preferred membrane pore size is dependent upon the operational characteristics of the amine based sorbent and the porous membrane utilized. Especially in the case of immobilized liquid membrane systems (discussed below), the preferred pore size is chosen according to bubble pressure determinations which characterize the relationship between the pore size and the amine based sorbent, and any pressure differential across the membrane. The pore size must be such that the pressure gradient across the membrane will not expel the amine based sorbent. Typically, the pore size is less than about 0.1 micron, with below about 0.05 microns preferred, and below about 0.01 micron especially preferred.

These porous membranes are utilized to form various types of venting membrane systems. These venting membrane systems comprise two basic structures which rely upon porous membranes, a liquid sorbent, and a partial pressure gradient which is higher on the side of the membrane where the gas is absorbed from and lower on the desorption side of the membrane. The first type of venting membrane system has porous membranes with a liquid sorbent immobilized within its pores, and a partial pressure gradient across the membrane. In this first type of system, the liquid sorbent absorbs carbon dioxide in a gaseous stream which flows past one side of the membrane. The liquid sorbent then transports the absorbed carbon dioxide through the pores to the second side of the membrane and desorbs the carbon dioxide. The second type of venting membrane system similarly has porous membranes with a liquid sorbent, and a partial pressure gradient which is higher where the gas is to be absorbed and lower where the gas is to be desorbed. In this system, however, the liquid sorbent is immobilized between two membranes or it engulfs hollow membranes through which the gas can be absorbed and desorbed. In this second type of system, the gaseous stream passes on one side of the membrane, is absorbed through the membrane by the liquid sorbent, transported to a second membrane, and subsequently desorbed through the second membrane. These venting membrane systems include: an immobilized liquid membrane system (FIGS. 1 and 2A), an immobilized liquid membrane system with a thin film composite subsystem (FIGS. 1 and 2B), a membrane contactor system (FIG. 3), a contained liquid membrane system (FIG. 4), and a concentric contained liquid membrane system (FIG. 5).

Referring to FIGS. 1 and 2A, which are meant to be exemplary, not limiting, the overall immobilized liquid membrane system 10 can be seen in FIG. 1. A carbon dioxide containing gaseous stream 1 passes over a plurality of membranes 20 on a first side 3 of the membranes 20. Amine based sorbent immobilized in pores of the membranes 20, absorbs carbon dioxide from the gaseous stream 1 at an absorption partial pressure. The amine based sorbent then transports the absorbed carbon dioxide across the pores to a second side 5 of the membranes 20. Since the second side 5 of the membranes 20 is maintained at a desorption partial pressure below the absorption partial pressure, the absorbed carbon dioxide desorbs, thereby regenerating the amine based sorbent.

This carbon dioxide removal system 10 comprises a plurality of membranes 20 as seen in FIG. 1. One of these membranes 25 is magnified in FIG. 2A. As can be seen from the magnification, the membrane 25 has a pore 30 containing the amine based sorbent 35. As is stated above, the gaseous stream 1 flows along and intimately contacts the first side 3 of the membrane 25 thereby intimately contacting the amine based sorbent 35 located in the pore 30 of the membrane 25. When the gaseous stream 1 contacts the amine based sorbent 35, the amine based sorbent 35 chemically absorbs carbon dioxide therein. The absorbed carbon dioxide then diffuses through the pore 30 to the second side 5 of the membrane 25 due to the pressure gradient produced by the difference between the absorption partial pressure and the lower desorption partial pressure. At the second side 5 of the membrane 25, the amine based sorbent regenerates through desorption of the absorbed carbon dioxide. The desorbed carbon dioxide then exits the reactor 10 in stream 7 while the gaseous stream 1 exits at point 9.

The immobilized liquid membrane with the thin film composite subsystem essentially parallels the immobilized liquid membrane system described above in FIGS. 1 and 2A, in operation and design. The only difference between these two venting membrane systems is a thin film composite 37 which covers the membrane pore 30 (see FIG. 2B). This thin film composite 37 selectively allows the passage of carbon dioxide and water. Since the thin film composite 37 is preferably located on the second side of the membrane 25, the side of the membrane having the lower partial pressure, it adds structural integrity to the immobilized amine based sorbent, thereby helping to prevent failure and the expulsion of the amine based sorbent 35 from the pores, and also increases system reliability. Possible thin films include: silicon, polyethylene, polysulfone, Nafion®, polyamides and others. Generally, these thin films possess a thickness of about 0.5 microns to about 5 microns, with a thickness of about 1.0 micron to about 2 microns preferred.

FIG. 3, which is meant to be exemplary, not limiting, discloses a membrane contactor type of venting membrane system. This system operates such that a gaseous stream 40 containing carbon dioxide enters the absorption membrane contactor 42. Within the absorption membrane contactor 42, carbon dioxide in the gaseous stream 40 passes through membrane 43 and is absorbed by the amine based sorbent 44 which preferably flows in a counter current direction to the flow of the gaseous stream 40 to attain maximum absorption. The amine based sorbent then transports the absorbed carbon dioxide to a desorption membrane contactor 45 where the amine based sorbent desorbs the absorbed carbon dioxide under the influence of a desorption partial pressure in chamber 47, thereby regenerating the amine based sorbent 44 for additional carbon dioxide absorption. The desorbed carbon dioxide passes through the membrane 46 and exits from chamber 47 in stream 48, while the regenerated amine based sorbent 44 is directed back to the absorption membrane contactor 42 in stream 49 and the gaseous stream 40 exits the absorption membrane contactor 42 at point 41. Additional equipment such as heaters and pumps may be utilized with this system.

FIG. 4, which is meant to be exemplary, not limiting, discloses a contained liquid system type of venting membrane system. In this system, a gaseous stream 51 enters the system and passes through the inside of a first bundle of hollow fibers 53. Carbon dioxide in the gaseous stream 51 diffuses through pores in the hollow fibers of the first bundle 53 and is absorbed by the amine based sorbent 55 which surrounds the first bundle 53 and a second bundle of porous hollow fibers 57. The amine based sorbent 55 then transports the absorbed carbon dioxide to the second bundle 57 having a desorption partial pressure inside the second bundle 57. As the amine based sorbent 55 passes over the second bundle 57, the absorbed carbon dioxide desorbs, passes through the pores of the second bundle 57, and exits the system at point 58. Meanwhile, the now essentially carbon dioxide free gaseous stream 51 exits the system at point 59 and the regenerated amine based sorbent 55 returns to the first bundle 53 for additional carbon dioxide absorption.

Finally, FIG. 5, which is meant to be exemplary, not limiting, discloses the concentric contained liquid membrane type venting membrane system. In this system, the amine based sorbent 61 is immobilized between an outer fiber 63 and an inner fiber 65. A gaseous stream 67 containing carbon dioxide enters the system into the interior of the inner fiber 65. The carbon dioxide diffuses through the inner fiber 65 and intimately contacts the amine based sorbent 61 where it is absorbed and then transported to the interior surface 64 of the outer fiber 63. At the outer fiber 63, the amine based sorbent 61 desorbs the absorbed carbon dioxide which passes through the outer fiber 63 to a desorption partial pressure area. Meanwhile, the gaseous stream 67 exits the inner fiber 65 at point 69.

Partial pressure gradients relate to the carbon dioxide partial pressure gradient sufficient to induce the absorption, transport, and desorption of the carbon dioxide by the amine based sorbent in each of the above described venting membrane systems. This partial pressure gradient corresponds to the difference in the absorption partial pressure which is typically about 7.6 mm Hg or less for a habitable environment, and the desorption partial pressure which is below the absorption partial pressure and which can approach 0 mm Hg, such as in a space vacuum. The desorption partial pressure can be provided by means including sweep gas, vacuum, and others.

The advantages of the carbon dioxide removal system of the present invention are numerous. In the prior art, many sorbents which became saturated with carbon dioxide required shutdown of the absorption process and separate regeneration of the saturated sorbent. The amine based sorbent of the present invention, on the other hand, is a liquid which is continuously regenerated. As a portion of the amine based sorbent absorbs carbon dioxide, the remainder of the amine based sorbent desorbs previously absorbed carbon dioxide, thereby creating a continuous carbon dioxide absorption system. As a result, the need for the prior art regeneration is eliminated, thereby simplifying the system operation.

Additional advantages are realized by the various venting membrane systems. The two immobilized liquid membrane systems, the contained liquid membrane system, and the concentric contained liquid membrane system, only requiring a single membrane unit, thereby reducing volume and weight requirements. Furthermore, these systems eliminate the requirements for power and ancillary equipment when used in combination with a space vacuum. Also, the immobilized liquid membrane system with the thin film composite subsystem has the additional advantage of increased structural integrity. The membrane contactor system, on the other hand, utilizes minimum membrane area while the absorption and desorption contactors allow for packing optimization.

The carbon dioxide removal system of the present invention is a vast improvement over the prior art. The present invention successfully reduces weight and volume requirements up to about 50% of the prior art by reducing sorbent bed size up to about 66% and overall system size up to about 50% or greater. Additionally, this system attains high cyclical life and continuous operation while reducing or eliminating regeneration energy requirements of the prior art by utilizing a pressure swing regeneration system which can rely upon space vacuum. Also, the venting membrane systems and the porous membranes utilized therein eliminate the requirement for intimate mixing of the amine based sorbent and the gaseous stream is eliminated, thereby allowing carbon dioxide removal in a gas-liquid system in zero gravity without the requirement of additional equipment. Finally, it is believed that the present system can continuously operate for greater than about 2 years since it essentially eliminates the thermal degradation problem experienced by prior art amine sorbent systems.

Although this invention has been shown and described with respect to detailed embodiments thereof, it would be understood by those skilled in the art that various changes in form and detail thereof may be made without departing from the spirit and scope of the claimed invention.

We claim:

1. A method for removing carbon dioxide from a gaseous stream using a carbon dioxide removal system, said system having at least one porous membrane with a first side and a second side, a liquid amine based sorbent located in the pores of said membrane, and a thin film composite subsystem located on said second side of said porous membrane and having a thickness of about 0.5 micron to about 5 microns, comprising the steps of:
   a. contacting the gaseous stream and the amine based sorbent on the first side of said membrane, wherein said first side of said membrane is exposed to an absorption partial pressure;
   b. absorbing any carbon dioxide from the gaseous stream into said amine based sorbent;
   c. transporting said absorbed carbon dioxide across the pores to said thin film composite subsystem, wherein said thin film composite subsystem is exposed to a desorption partial pressure which is below said absorption partial pressure; and
   d. desorbing said absorbed carbon dioxide at said thin film composite subsystem.

2. A method for removing carbon dioxide as in claim 1 wherein said sorbent is a polyethylene imine based sorbent.

3. An immobilized liquid membrane system for removing carbon dioxide from a gaseous stream, comprising:
   a. at least one porous membrane, said porous membrane having a first side and a second side;
   b. a liquid amine based sorbent for absorbing and desorbing carbon dioxide, said amine based sorbent located in the pores of said porous membrane;
   c. a means for producing a carbon dioxide partial pressure gradient across said porous membrane sufficient to induce absorption of carbon dioxide at said first side of said porous membrane, transport of said absorbed carbon dioxide across said porous membrane, and desorption of said absorbed carbon dioxide at said second side of said membrane; and
   d. a thin film composite subsystem located on said second side of said porous membrane and constructed and arranged for carbon dioxide selectively, wherein said thin film composite subsystem covers the pores on said second side of said porous membrane and has a thickness of about 0.5 micron to about 5 microns.

4. A system as in claim 3 wherein said sorbent is a polyethylene imine based sorbent.

5. A system as in claim 3 wherein said means for producing a partial pressure gradient is a sweep gas or a space vacuum.

* * * * *